(12) United States Patent
Slark et al.

(10) Patent No.: US 7,645,831 B2
(45) Date of Patent: Jan. 12, 2010

(54) REACTIVE HOT MELT ADHESIVES

(75) Inventors: Andrew Slark, Wokingham (GB); Neal Williams, Warfield (GB); Gavin Toovey, Binfield (GB)

(73) Assignee: Henkel AG & Co. KGaA, Duesseldorf (DE)

( * ) Notice: Subject to any disclaimer, the term of this patent is extended or adjusted under 35 U.S.C. 154(b) by 71 days.

(21) Appl. No.: 10/810,772

(22) Filed: Mar. 26, 2004

(65) Prior Publication Data

US 2005/0215702 A1   Sep. 29, 2005

(51) Int. Cl.
| | |
|---|---|
| B32B 27/40 | (2006.01) |
| B65C 9/25 | (2006.01) |
| B65C 11/06 | (2006.01) |
| C08G 18/00 | (2006.01) |
| C08G 18/08 | (2006.01) |
| C08G 18/28 | (2006.01) |
| C08G 18/10 | (2006.01) |
| C08J 3/00 | (2006.01) |
| C08K 3/20 | (2006.01) |
| C08L 75/00 | (2006.01) |
| C09J 5/00 | (2006.01) |
| C09J 101/00 | (2006.01) |
| C09J 201/08 | (2006.01) |

(52) U.S. Cl. .................. 524/590; 156/311; 156/320; 156/330.9; 156/331.1; 156/331.4; 156/331.7; 428/423.1; 524/507; 524/589; 525/123; 525/131; 525/455; 528/44; 528/59; 528/65; 528/66; 528/73; 528/76; 528/80; 528/84; 528/85

(58) Field of Classification Search .................. 524/507, 524/589, 590; 528/44, 59, 65, 66, 73, 76, 528/80, 84, 85; 428/423.1; 156/311, 320, 156/330.9, 331.1, 331.4, 331.7; 525/123, 525/131, 455

See application file for complete search history.

(56) References Cited

U.S. PATENT DOCUMENTS

| | | | |
|---|---|---|---|
| 4,704,446 A | 11/1987 | Goel | |
| 4,757,123 A * | 7/1988 | Younes | ........................ 528/53 |
| 5,001,210 A | 3/1991 | Coury et al. | |
| 6,482,878 B1 * | 11/2002 | Chu | ........................... 524/271 |
| 7,022,804 B2 | 4/2006 | Miskovic et al. | |
| 2002/0164486 A1 * | 11/2002 | Guse et al. | ............... 428/423.1 |

FOREIGN PATENT DOCUMENTS

| | | |
|---|---|---|
| EP | 0 468 405 | 1/1992 |
| EP | 1 378 531 | 1/2004 |
| EP | 1378531 A1 * | 1/2004 |

OTHER PUBLICATIONS

Handbook of Adhesives, Third Edition, 1990, Irving Skeist, Editor., pp. 8-9.

* cited by examiner

*Primary Examiner*—Patrick D Niland
(74) *Attorney, Agent, or Firm*—Sun Hee Lehmann

(57) ABSTRACT

Reactive hot melt adhesives compositions with long open time and/or high green strength are prepared by the use of urethane diols. These results are achievable at moderate/low application viscosity or low application temperature.

13 Claims, No Drawings

REACTIVE HOT MELT ADHESIVES

FIELD OF THE INVENTION

The invention relates to hot melt adhesives, in particular reactive hot melt adhesives having long open time and/or improved green strength.

BACKGROUND OF THE INVENTION

Hot melt adhesives are solid at room temperature but, upon application of heat, melt to a liquid or fluid state in which form they are applied to a substrate. On cooling, the adhesive regains its solid form. The hard phase(s) formed upon cooling the adhesive imparts all of the cohesion (strength, toughness, creep and heat resistance) to the final adhesive. Curable hot melt adhesives, which are also applied in molten form, cool to solidify and subsequently cure by a chemical crosslinking reaction. An advantage of hot melt curable adhesives over traditional liquid curing adhesives is their ability to provide "green strength" upon cooling prior to cure.

The majority of reactive hot melts are moisture-curing urethane adhesives. These adhesives consist primarily of isocyanate terminated polyurethane prepolymers that react with surface or ambient moisture in order to chain-extend, forming a new polyurethane polymer. Polyurethane prepolymers are conventionally obtained by reacting diols with diisocyanates. Pure diols are favored for use, instead of polyols with higher functionality, to avoid excessive branching that can lead to poor pot stability. Methylene bisphenyl diisocyanate (MDI) is favored over lower molecular weight isocyanates to minimize volatility. Cure is obtained through the diffusion of moisture from the atmosphere or the substrates into the adhesive, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a crosslinked material held together primarily through urea groups and urethane groups.

The prior art discloses that the performance of reactive hot melt adhesives for most applications may be substantially improved by the incorporation of low molecular weight acrylic polymers and/or incorporating crystalline diols, e.g. polyesters. Prior art adhesives are tough, with good low temperature flexibility, heat and chemical resistance, and specific adhesion to polar substrates. Adhesion to a wide range of other substrates may be obtained through the addition of adhesion promoters such as silane coupling agents. However, it is difficult to achieve long open time and/or high green strength at a reasonable application viscosity. High green strength can be achieved by using crystalline materials (e.g polyester diols), however this substantially limits the open time achievable. Alternatively, this can be achieved by the use of polyurethanes with high molecular weight, however the resulting application viscosity is high and the open time is limited. Despite advances in the art, there remains a need for improvements in reactive hot melt technology to expand the application of such adhesives and their effectiveness in such applications. The present invention addresses this need.

SUMMARY OF THE INVENTION

The invention provides moisture curable reactive hot melt adhesive compositions that have long open time and/or high green strength via the use of urethane diols. These results are achievable at moderate/low application viscosity or low application temperature. In a preferred embodiment, the reactive hot melt adhesive comprises polyurethane-acrylic hybrids. Various ingredients, such as polyether polyol, polyester polyol, (meth)acrylic copolymer, thermoplastic copolymer or tackifier may be utilized in conjunction with the urethane diol.

A further embodiment of the invention is directed to a method of improving the open time and/or green strength of a polyurethane hot melt adhesive comprising a urethane diol according to the previous embodiments above.

Another embodiment of the invention is directed to a method of applying a polyurethane hot melt adhesive comprising a urethane diol at a low melt viscosity or a low application temperature.

Yet another embodiment of the invention is directed to a method for bonding materials together which comprises applying the reactive hot melt adhesive composition of the invention in a liquid form to a first substrate, bringing a second substrate in contact with the composition applied to the first substrate, and subjecting the applied composition to conditions which will allow the composition to cool and cure to an irreversible solid form, said conditions comprising moisture.

Still another aspect of the invention is directed to an article of manufacture comprising the adhesive of the invention.

DETAILED DESCRIPTION OF THE INVENTION

All percents are percent by weight of the adhesive composition, unless otherwise stated.

It has now been discovered that adhesives with long open times and/or high green strength can be prepared by using urethane diols. It is particularly unexpected that these results are achievable at moderate/low application viscosity or at low application temperature.

Most commonly, polyurethane prepolymers are prepared by the polymerization of a polyisocyanate with a polyol, most preferably the polymerization of a diisocyanate with a diol. The moisture curable, hot melt polyurethane adhesives of the invention may be prepared through the reaction of a mixture of polyols with an isocyanate-containing compound at a typical temperature from about 100° C. to 130° C. The adhesives of the invention comprise an isocyanate, MDI being preferred, urethane diols and optionally polyether polyol(s), optionally polyester polyol(s), optionally (meth)acrylic copolymers, optionally thermoplastic poylmers and optionally tackifiers.

The urethane diol used in the preparation of the polyurethane polymer is preferably the reaction product of a diamine or an alkanolamine with a cyclic carbonate. Suitable examples of compounds containing an amino group and a further group selected from amino and hydroxy include diamines, alkanolamines and amine terminated polyamides or polyethers. Mixtures of such compounds can also be used. The overall urethane diol concentration is in the range of 1 to 99 wt %, more preferably in the range of about 1 to 50 wt % and more preferably in the range of about 2.5 to 25 wt % although this is not limiting.

Diamines are compounds which contain two amine groups. Suitable examples of diamines include the linear diamines such as hydrazine, ethylene diamine, 1,2 propane diamine, 1,3 propane diamine, 1,4 butane diamine, 1,5 pentane diamine, 1,6 hexane diamine, 1,7 heptane diamine, 1,8 octane diamine, 1,10 decane diamine and 1,12 dodecane diamine. Other examples of suitable linear diamines include the Jeffamine™ range such as the polyoxypropylene diamines available as Jeffamine™ D230, Jeffamine™ D400 and Jeffamine™ D2000 as well as Jeffamine™ EDR-148, a triethylene glycol diamine. Examples of alkyl substitued branched diamines include 2 methyl 1,5 pentane diamine, 2,2,4 trimethyl-1,6 hexane diamine and 2,4,4 trimethyl-1,6 hexane diamine. Cyclic diamines may also be used, such as isophorone diamine, cyclohexane diamine, piperazine and 4,4'-methylene bis(cyclohexyl amine).

Alkanolamines are compounds containing amine moieties and hydroxyl moieties. Suitable examples of alkanolamines include ethanolamine, propanolamine and 2-(methyl amino) ethanol. Most preferred are ethanolamine and propanolamine.

Primary amines are preferred and most preferred are ethylene diamine, 1,4 butane diamine, 1,6 hexane diamine, 2 methyl 1,5 pentane diamine, 2,2,4 trimethyl-1,6 hexane diamine, 2,4,4 trimethyl-1,6 hexane diamine and polyoxypropylene diamines.

Preferred suitable cyclic carbonates used to react with the diamines or alkanolamines include glycerol carbonate, ethylene carbonate, propylene carbonate and butylene carbonate and mixtures thereof.

When a diamine reacts with ethylene carbonate, the hydroxyl moieties on the urethane diol are of the primary type. The reaction product of ethylene carbonate with a diamine of general formula $R(NH_2)_2$, where R represents an alkyl chain, is $HO(CH_2)_nOOCNHRNHCOO(CH_2)_nOH$ where n is 2. This contains two urethane linkages. Where the diamine reacts with a cyclic carbonate of more than two carbons in the longest straight chain, for example propylene carbonate or butylene carbonate, that is where n is 3 and 4 respectively, a mixture of both primary and secondary hydroxyl moieties result. In such a case some of the urethane diol molecules will have primary hydroxyls at each end, others will comprise secondary hydroxyls only and yet others will contain one of each hydroxyl type.

When an alkanolamine of general formula $NH_2ROH$ reacts with the cyclic carbonate only one urethane linkage results. Where the cyclic carbonate is ethylene carbonate a urethane diol of general formula $HO(CH_2)_nOOCNHROH$ where n is 2 is formed. In this case the urethane diol may have a secondary hydroxyl group if the hydroxyl on the alkanol from which it was made is a secondary type. Where n is greater than 2 the same rules that applied to the diamines apply.

The urethane prepolymers that can be used to prepare the adhesives of the invention are those conventionally used in the production of polyurethane hot melt adhesive compositions. Any suitable compound, which contains two or more isocyanate groups, may be used for preparing the urethane prepolymers. Typically from about 2 to about 30 parts by weight of an isocyanate is used, although this is not limiting. Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyidiphenyl-methane-2,2', 5,5-tetratetraisocyanate, and the like. While such compounds are commercially available, methods for synthesizing such compounds are well known in the art. Preferred isocyanate-containing compounds are methylenebisphenyldiisocyanate (MDI; 2,4' MDI, 4,4' MDI and polymeric MDI), isophoronediisocyanate (IPDI), hydrogenated methylenebisphenyldiisocyanate (HMDI) and toluene diisocyanate (TDI).

Optional polyols that are used in the invention include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof. The polyol is typically used in an amount of between about 5 to about 70 parts by weight.

Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

A number of suitable polyols are commercially available. Non-limiting examples include Voranol P400, P725, P1000, P2000, P4000 (Dow).

The optional polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol-1,4, cyclohexanediol-1,4,1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms.

Non-limiting commercially available polyester polyols that may be used in the practice of the invention include Dynacol 7360, 7380, 7381 (Degussa-Huls), Rucoflex S-105-30 (Bayer) and Stepanpol PN110 (Stepan).

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above.

Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like.

The optional (meth)acrylic polymer has a molecular weight (Mw) in the range 10,000 to about 250,000 g/mole. The average molecular weight is determined by Size Exclusion Chromatography (otherwise known as Gel Permeation Chromatography) calibrated against Poly(methyl methacrylate) standards of narrow molecular weight distribution. The polymer may be linear or branched and may consist of, but not limited to, copolymerised alkyl functional (meth)acrylic monomers, acid functional (meth)acrylic monomers, tertiary amine functional (meth)acrylic monomers or hydroxyl functionalized (meth)acrylic comonomers. The latter option promotes further green strength by becoming covalently bonded into the polyurethane structure. Other functional comonomers include, without limitation amine, isocyanate, and thio functional monomers.

Virtually any ethylenically unsaturated comonomer may be utilized in the compositions of the present invention. For functional comonomers, acid functional or tertiary amine monomers can be used for any molecular weight, but if hydroxyl functional groups are preferred then lower molecular weight components are preferred.

Acrylic comonomers may be formulated and polymerised so as to produce a wide range of Tg values, as between about −48° C. and 105° C., more preferably about −20° C. to 85° C. and more preferably 15° C. to 85° C. Suitable comonomers include the $C_1$ to $C_{12}$ esters of methacrylic and acrylic acids including, but not limited to methyl methacrylate, ethyl methacrylate, n-propyl, iso-propyl methacrylate, n-butyl methacrylate, isobutyl methacrylate, n-hexyl methacrylate, n-octyl methacrylate 2-ethylhexyl methacrylate, dodecyl (lauryl) methacrylate or the corresponding acrylates. Mixtures of compatible (meth)acrylate monomers may also be used. Methacrylic and acrylic comonomers based on esters of methacrylic and acrylic acid with poly(ethylene glycol) and/or poly(propylene glycol) and/or glycol ethers may also be used. Other additional vinyl comonomers that may be used include the vinyl esters (e.g. vinyl acetate and vinyl propionate); vinyl ethers; esters of crotonic acid, maleic acid, fumaric acid & itaconic acid; styrene; alkyl styrenes; acrylonitrile; butadiene; etc. as well as comonomers thereof. The particular monomers selected will depend, in large part, upon the end use for which the adhesives are intended. Thus, adhesives to be used in pressure sensitive applications or in applications wherein adhesion to metal is required will be selected to obtain a lower Tg polymer than may be desired in non-pressure sensitive applications or those involving more easily bonded substrates.

Suitable acid functional comonomers include, but are not limited to, methacrylic acid and acrylic acid. Suitable hydroxyl functionalized comonomers that can be incorporated include, but are not limited to, 2-hydroxyethylmethacrylate, 2-hydroxyl propyl methacrylate and 2-hydroxybutyl methacrylate or the corresponding acrylates. Suitable amine-functionalized comonomers include, but are not limited to, dimethylaminoethyl methacrylate, diethylaminoethyl methacrylate or the corresponding acrylates.

The polymers may be blended with the polyol prior to reaction thereof with the isocyanate or they may be added directly to the isocyanate terminated prepolymer.

When the adhesive is to be prepared utilizing monomeric materials, the respective monomers may be added to the polyols and polymerized therein prior to formation of the prepolymer or may be added to the already formed prepolymer and the acrylic polymerization subsequently performed. In the case of polyamino or polymercapto containing prepolymers, in-situ vinylic polymerization must be performed only in the pre-formed prepolymer.

It is also possible to polymerize the polymers in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

Although (meth)acrylic copolymers are desirable, other polymers that are compatible with the formulations of the invention may be used. These include, but are not exclusive to copolymers rich in other unsaturated monomers such as styrene, alkyl styrenes, butadiene, vinyl acetate, vinyl propionate, vinyl chloride, vinylidene chloride, acrylonitrile, vinyl ethers, vinyl acetals etc.

While the adhesives may be used directly as described above, if desired the adhesives of the present invention may also optionally be formulated with conventional additives that are compatible with the composition. Such additives include plasticizers, compatible tackifiers, curing catalysts, dissociation catalysts, fillers, anti-oxidants, pigments, adhesion promoters, stabilizers, aliphatic $C_5$-$C_{10}$ terpene oligomers and the like. Conventional additives that are compatible with a composition according to this invention may simply be determined by combining a potential additive with the composition and determining if they are compatible. An additive is compatible if it is homogenous within the product. Non-limited examples of suitable additives include, without limitation, rosin, rosin derivatives, rosin ester, aliphatic hydrocarbons, aromatic hydrocarbons, aromatically modified aliphatic hydrocarbons, aliphatically modified aromatic hydrocarbons, terpenes, terpene phenol, modified terpene, high molecular weight hindered phenols and multifunctional phenols such as sulfur and phosphorous-containing phenol, terpene oligomers, dimorpholinodiethyl ether, paraffin waxes, microcrystalline waxes and hydrogenated castor oil.

The reactive hot melt adhesives of the invention may also contain flame retardant components. Fire retardant additives known in the art for imparting flame resistance to polyurethane compositions may be added. Such compounds include inorganic compounds such as a boron compound, aluminum hydroxide, antimony trioxide and the like, and other halogen compounds including halogen-containing phosphate compounds such as tris(chloroethyl)phosphate, tris(2,3-dichloropropyl)-phosphate, and the like. These and other flame retarding compositions are described in U.S. Pat. Nos. 3,773,695, 4,266,042, 4,585,806, 4,587,273 and 4,849,467, and European Patent No. 0 587 942. In a preferred embodiment, ethylenebistetrabromophthalimide and/or tris(2,3-dibromopropyl)-isocyanurate is added as a prime flame retardant component. The ethylenebistetrabromophthalimide and/or tris(2,3-dibromopropyl)isocyanurate may be used with or without other flame retardants. The composition may further comprise a chlorinated paraffin and/or an aryl phosphate ester as a further flame retardant component.

The invention also provides a method for bonding articles together which comprises applying the reactive hot melt adhesive composition of the invention in a liquid melt form to a first article, bringing a second article in contact with the composition applied to the first article, and subjecting the applied composition to conditions which will allow the composition to cool and cure to a composition having an irreversible solid form, said conditions comprising moisture. The composition is typically distributed and stored in its solid form, and is stored in the absence of moisture. When the composition is ready for use, the solid is heated and melted prior to application. Thus, this invention includes reactive polyurethane hot melt adhesive compositions in both its solid form, as it is typically to be stored and distributed, and its liquid form, after it has been melted, just prior to its application.

After application, to adhere articles together, the reactive hot melt adhesive composition is subjected to conditions that will allow it to solidify and cure to a composition that has an irreversible solid form. Solidification (setting) occurs when the liquid melt is subjected to room temperature. Curing, i.e. chain extending, to a composition that has an irreversible solid form, takes place in the presence of ambient moisture.

As used herein, "irreversible solid form" means a solid form comprising polyurethane polymers extended from the aforementioned polyurethane prepolymers. The composition having the irreversible solid form typically can withstand temperatures of up to 150° C. Using a flame retardant the thermal stability of the irreversible solid can be improved.

The reactive hot melt compositions of the invention are useful for bonding articles composed of a wide variety of substrates (materials), including but not limited to various types of wood, composites, metal, polymers, glass and fabrics or textiles. As such, these adhesives find particular use in applications such as the manufacture of doors including entry doors, garage doors and the like, the manufacture of architectural panels, bonding components on the exterior of vehicles and the like, water towers, bonding to exterior surfaces, bonding to wood with high levels of pitch and marine and automotive applications. Other non-limiting uses include textile bonding applications (e.g. foam, fabric, carpet and clothing), use in the manufacture of footwear (shoes), and use as a glazing/backbedding compound in the manufacture of windows.

The invention is further illustrated by the following non-limiting examples.

EXAMPLES

Typical Reactive Hot Melt Preparation

Ingredients including urethane diols and optional polyether polyols, polyester polyols, acrylic copolymers and tackifiers were mixed together at 80-100° C. in a flange flask equipped with a stirrer and thermocouple. After allowing time for adequate mixing, vacuum was applied to the flask, typically for a period of 1 hour during which the temperature was raised to 105-110° C. The vacuum was removed and the polyisocyanate was added. After thorough mixing, the vacuum was reapplied and the reaction was allowed to continue for 1 hour. The material was removed, cooled and stored.

Pre-Prepared Urethane Diol

The urethane diols were made by reacting a cyclic carbonate with a diamine typically in a 2.0-2.2:1 molar ratio. The carbonate was heated in a reactor to 50° C., and then the diamine was added slowly over the course of about an hour, controlling the exotherm to keep the reaction temperature at 90° C. The reaction temperature was kept at 90° C. for a further 4 hours until more than 95% of the starting amine had reacted. The urethane diol was stored and used as an ingredient using the method for above.

In Situ Preparation of Urethane Diol

The Reactive Hot Melt Adhesive was prepared as above except that the carbonate and diamine were charged into the reactor containing polyol and reacted for 4 hours at 90° C., and then a further 1 hour at 120° C., with a 2.0-2.2:1 carbonate to diamine ratio until more than 95% of the starting amine had reacted.

The following test methods were used to evaluate adhesive performance:

Melt Viscosity:

Measured using a Brookfield Viscometer model RVDV-1+ with a Model 74R temperature controller and Thermosel unit, using spindle no. 27. The adhesive is heated in an oven to 120° C. 14 g of adhesive is weighed into a disposable aluminium viscometer tube. The tube is inserted into the Viscometer and left to equilibrate to a constant viscosity reading at 120° C. for 20 minutes.

Initial (Green) Strength:

A 150 micron thick film of adhesive was applied to a glass plate, preheated at 120° C. A strip of PVC (25 mm wide, 7 mil thick) with a hole punched near one end was applied over the adhesive. The plate is inverted and a thermocouple is attached to the glass plate to record the temperature as it falls. At a suitable temperature, a 1 Newton weight was suspended from the hole in the vinyl at the time set at t=0. At 1 minute intervals, the temperature and distance moved was recorded. The peel rate at these intervals was calculated.

Open Time:

The adhesive is preheated to 120° C. and a 150 micron thick film is applied to MDF. The time is set at t=0. At intervals of 30 seconds or 1 minute, a paper strip is applied using a 2.0 Kg roller across the surface of the paper in contact with the adhesive. The paper is then removed immediately. The open time limit occurs when there is no paper tear resulting from a lack of adequate wetting of the paper by the adhesive.

Ingredients in Examples

Carbonates for Urethane Diols
Ethylene Carbonate (EC) obtained from Huntsman
Propylene Carbonate (PC) obtained from Huntsman
Butylene Carbonate (BC) obtained from Huntsman Diamines for Urethane Diols
4,4' methylene bis (cyclohexyl diamine) (MCHD) obtained from Aldrich
1,6 hexanediamine (HD) obtained from Aldrich 2-methyl-1,5-pentane diamine (Dytek A) obtained from Du Pont 2,2,4-trimethyl-1,6-hexanediamine (TMHD) obtained from Aldrich Jeffamine 400 (J400), amine terminated polypropylene glycol, obtained from Huntsman Degassing Agent
  Modaflow obtained from Elementis Polyether Polyols
  Poly(propylene glycol) Voranol P2000 from Dow Polyester Polyols
  Dynacol 7360 obtained from Degussa-Huls
  Dynacol 7380 obtained from Degussa-Huls
  Dynacol 7381 obtained from Degussa-Huls Acrylic Copolymers
  Elvacite 2016 obtained from Lucite International
  Elvacite 2971 obtained from Lucite International
  Elvacite 2903 obtained from Lucite International Tackifiers
  Novares TK-100, obtained from Ruetgers VFT Polyisocyanates
  4,4' diphenyl methane diisocyanate (MDI), obtained from Bayer Catalyst
  Dimorpholinodiethyl ether, obtained from Alfa Comparative Example 1

The following adhesive was used as a benchmark of the prior art, the composition of which is shown below.

| | |
|---|---|
| Modaflow. | 0.1% |
| Voranol P2000 | 38.8% |
| Elvacite 2016 | 28.4% |
| Dynacoll 7360 | 19.9% |
| MDI | 11.7% |
| DMDEE | 0.2% |

Table 1 shows formulations for various urethane diols (examples 3-8) compared to sample 2 which is a polyether diol of similar molecular weight at similar concentrations. Examples 9 and 10 contain urethane diols at higher concentrations.

TABLE 1

| sample | Moda flow | Voranol P400 | Voranol P2000 | UD type | UD concn | Elvacite 2971 | Elvacite 2903 | MDI |
|---|---|---|---|---|---|---|---|---|
| 2 | 0.1 | 6.00 | 43.90 | — | — | 16.81 | 14.72 | 18.48 |
| 3 | 0.1 | — | 46.05 | EC-MCHD | 6.31 | 14.85 | 13.01 | 19.68 |
| 4 | 0.1 | — | 43.60 | EC-DytekA | 6.15 | 15.30 | 13.40 | 21.43 |
| 5 | 0.1 | — | 42.94 | PC-DytekA | 6.00 | 16.45 | 14.40 | 20.11 |
| 6 | 0.1 | — | 45.42 | BC-MCHD | 6.15 | 15.99 | 14.01 | 18.32 |
| 7 | 0.1 | — | 43.38 | BC-DytekA | 6.00 | 16.56 | 14.50 | 19.57 |
| 8 | 0.1 | — | 43.80 | BC-TMHD | 6.00 | 16.77 | 14.67 | 18.64 |
| 9 | 0.1 | — | 34.04 | BC-DytekA | 13.50 | 13.03 | 11.42 | 27.91 |
| 10 | 0.1 | — | 34.04 | PC-J400 | 18.00 | 13.03 | 11.42 | 23.41 |

Table 2 shows performance data for samples 1-10.

TABLE 2

| Sample | Viscosity @ 120° C. (cP) | Open time (minutes) | Dynamic Peel @ 32.5° C. (mm/minute) |
|---|---|---|---|
| 1 | 15,000 | 10 | 21 |
| 2 | 11,400 | >60 | 8 |
| 3 | 24,500 | >90 | 6 |
| 4 | 11,000 | >90 | 12 |
| 5 | 14,500 | >90 | 3 |
| 6 | 26,000 | >90 | 2 |
| 7 | 15,800 | >90 | 3 |
| 8 | 27,100 | 8 | 0 |
| 9 | 11,600 | 10 | 2 |
| 10 | 7,500 | 60 | 4 |

Compared to comparative examples 1 and 2, examples 3-8 with different urethane diols at similar concentrations produce longer open times and/or an improvement in green strength (lower peel rate). For examples 9 and 10 with higher urethane diol concentrations, the green strength is further improved compared to comparative example 1. This is achieved with a similar or longer open time and a lower application viscosity.

| Sample 11 | |
|---|---|
| Modaflow. | 0.10% |
| Voranol P2000 | 34.70% |
| BC-Dytek A | 7.96% |
| Elvacite 2971 | 6.78% |
| Elvacite 2903 | 6.19% |
| Dynacoll 7360 | 1.12% |
| Dynacoll 7380 | 11.19% |
| Novares TK100P | 9.94% |
| Polywax 1000 | 0.01% |
| MDI | 21.81% |
| DMDEE | 0.1% |
| Sample 12 | |
| Modaflow | 0.20% |
| Voranol P2000 | 34.20% |
| BC-Dytek A | 9.01% |
| Elvacite 2016 | 20.12% |

-continued

| | |
|---|---|
| Dynacoll 7381 | 6.03% |
| Novares TK100P | 8.05% |
| Polywax 1000 | 0.01% |
| MDI | 22.33% |
| DMDEE | 0.05% |

| Sample | Viscosity @ 120° C. (cP) | Open time (minutes) | Dynamic Peel @ 32.5° C. (mm/minute) |
|---|---|---|---|
| 1 | 15,000 | 10 | 21 |
| 11 | 4,000 | 6 | 4 |
| 12 | 7,500 | 6 | 5 |

Compared to sample 1, samples 11 and 12 provide reasonable open time and much improved green strength with a substantially lower application viscosity at the same application temperature. The practical advantages of such a system are that the adhesive can be applied much more easily and wets out or penetrates substrates much better, resulting in strong bonds after curing. The melt viscosity of samples 11 and 12 at 90-100° C. is similar to the melt viscosity of 1 at 120° C. This means that 11 and 12 can be applied at a much lower application temperature and achieve improved green strength. This is an unusual combination of properties, as green strength tends to increase as melt viscosity increases. The practical advantages of such a system are longer equipment lifespan, lower heating costs, better stability during application, reduced free polyisocyanate emission, and useful for temperature sensitive substrates.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A moisture curable hot melt adhesive composition prepared by reacting a polyisocyanate with a mixture comprising (i) a urethane diol and (ii) a polyether polyol or polyester diol or both, said urethane diol being the reaction product of a cyclic carbonate and a compound containing an amino group and a further group selected from the group consisting of amino groups and hydroxyl groups, which composition, in the presence of moisture, cures to an irreversible solid form.

2. The composition of claim 1 wherein the said compound is a diamine, an alkanolamine, an amine terminated polyamide or mixture thereof.

3. The composition of claim 2 wherein said compound is selected from the group consisting of ethylene diamine, 1,4 butane diamine, 1,6 hexane diamine, 2 methyl 1,5 pentane diamine, 2,2,4 trimethyl-1,6 hexane diamine, 2,4,4 trimethyl-1,6 hexane diamine, polyoxypropylene diamines, ethanolamine, propanolamine and mixtures thereof.

4. The composition of claim 1 wherein said cyclic carbonate is selected from the groups consisting of glycerol carbonate, ethylene carbonate, propylene carbonate and butylene carbonate.

5. The composition of claim 1 wherein said mixture further comprises a (meth)acrylic polymer, a thermoplastic polymer, a tackifying resin or a mixture thereof.

6. The composition of claim 1 which is in solid form.

7. The composition of claim 1 which is in liquid form.

8. The composition of claim 1 wherein the urethane diol is made in situ during the preparation of the polyurethane prepolymers.

9. The composition of claim 7 which has a melt viscosity suitable to enable application at a temperature of less than 100° C.

10. A method of bonding materials together which comprises applying the moisture curable hot melt adhesive composition of claim 1 in a liquid form to a first substrate, bringing a second substrate in contact with the composition applied to the first substrate, and subjecting the composition to conditions which will allow the compositions to cool and cure to an irreversible solid form, the conditions comprising moisture.

11. The method of claim 10 wherein the adhesive composition in liquid form is applied at a temperature of less than 100° C.

12. The method of claim 10 wherein the adhesive composition in liquid form is applied at a temperature of 90° C. to 100° C.

13. An article of manufacture which comprises the composition of claim 1 which composition has been cured by exposure to moisture.

* * * * *